J. P. FISHER.
GAS MEASURING DEVICE.
APPLICATION FILED MAR. 13, 1916.
1,287,274.
Patented Dec. 10, 1918.
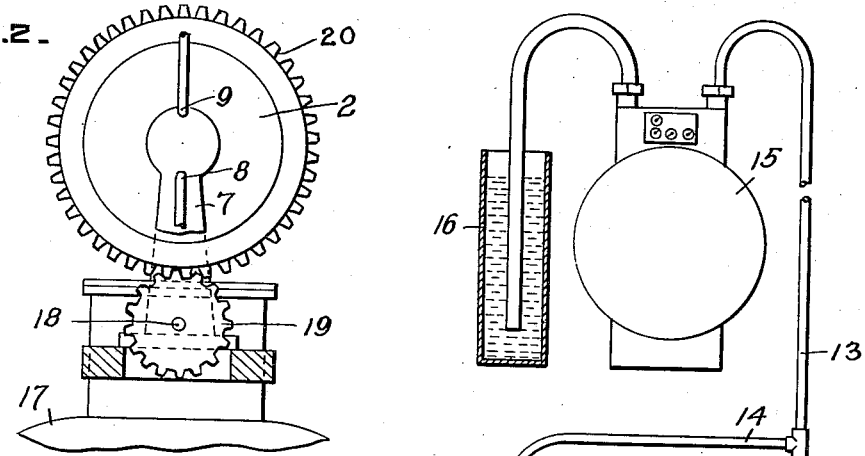
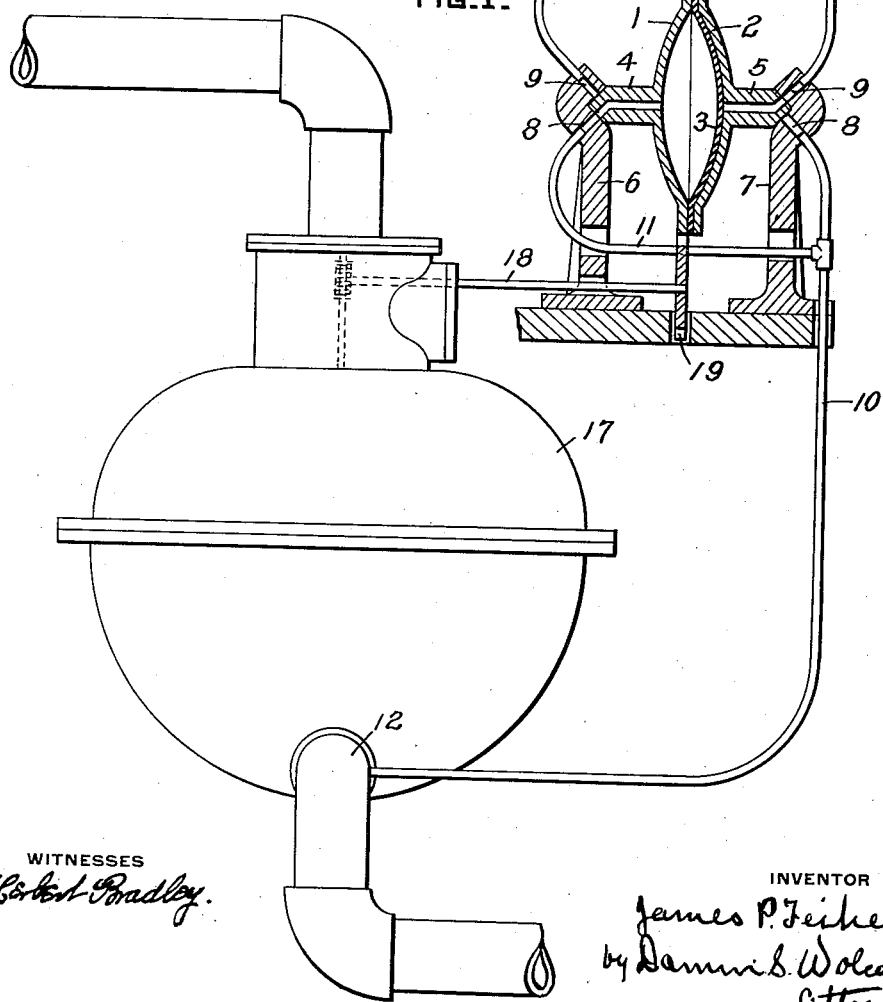

UNITED STATES PATENT OFFICE.

JAMES P. FISHER, OF BARTLESVILLE, OKLAHOMA.

GAS-MEASURING DEVICE.

1,287,274. Specification of Letters Patent. Patented Dec. 10, 1918.

Application filed March 13, 1916. Serial No. 83,859.

*To all whom it may concern:*

Be it known that I, JAMES P. FISHER, residing at Bartlesville, in the county of Washington and State of Oklahoma, a citizen of the United States, have invented or discovered certain new and useful Improvements in Gas-Measuring Devices, of which improvements the following is a specification.

It has heretofore been the practice to measure gas at the pressure in the pipe line, such pressure being considerably above atmospheric pressure, but as the pressure varies due to variations in the amount used, and the amount supplied, it is necessary to provide means for recording such variations in pressure, and to multiply the meter reading by a factor depending upon the average pressure during the time for which the meter reading is taken. It is evident that such means can give only an approximate determination of the amount of gas flowing through the line.

The invention described herein has for its object the withdrawal from the pipe line of quantities of gas which have a predetermined volumetric relation to the gas flowing through the pipe line, expanding such quantities down to a pressure at which the gas is to be used, and measuring such volume at the reduced pressure. The invention is hereinafter more fully described and claimed.

In the accompanying drawing forming a part of this specification, Figure 1 is a view partly in side elevation and partly in section illustrating my improvement, and Fig. 2 is an end elevation showing the upper portion of the main or high pressure meter, and the means for withdrawing predetermined quantities of gas from the pipe line and feeding them to the low pressure or auxiliary meter.

The means employed for withdrawing definite portions of gas from the pipe line consists of two disks 1 and 2 having adjacent faces concave and a flexible diaphragm 3 dividing the chamber formed by the disks into two compartments, said diaphragms being adapted to bear uniformly against the concave faces of the disks to force from the respective compartments all the gas which had previously entered thereinto. This measuring wheel is provided with trunnions 4 and 5 so mounted in standards 6 and 7 as to be easily rotated. Provision is made for the flow of gas from the pipe line into each of the compartments alternately, and the discharge of such gas from one compartment as the other is being charged from the pipe line, the gas so discharged being caused to flow through an auxiliary meter. These objects can be conveniently attained by forming passages through the trunnions, said passages being at one side of the apices of the conical ends of the trunnions as shown. Ports 8 and 9 extend through the bearings or seats for the ends of the trunnions and are so located, that as the wheel is rotated, the passage in one of the trunnions as 4 will register with the port 8 connected to the pipe line, at the same time that the port 9 connected to the meter registers with the passage in the trunnion 5. As shown the ports 8 in the standards are connected by a pipe 10 and its branch 11 to the pipe line 12, the ports 9 are connected by a pipe 13 and its branch 14 to the inlet of the auxiliary meter 15. Provision is made for maintaining the gas at a uniform pressure, *i. e.*, the pressure at which the gas is to be sold. This can be conveniently effected by discharging the gas at a certain depth below the surface of liquid in an open topped tank 16 from which these small volumes of gas escape into the air.

As the volumes of gas withdrawn from the pipe line to be measured at low pressure, should have a certain fixed relation to the volume of gas passing a given point in the pipe line, the means employed for rotating the wheel should be controlled in accordance with the rate of flow of gas through the pipe line. A convenient means to that end consists of a meter 17 interposed in the pipe line and adapted to register the gas flowing therethrough. A shaft 18 is connected to one of the pinions of the registering mechanism of the high pressure meter, and has secured thereto a pinion 19 intermeshing with teeth on the periphery of the measuring wheel 20.

In the position of the parts of the mechanism shown in Fig. 1 the passage in the trunnion 4 is connected to the pipe line and the passage in trunnion 5 is connected to port 9 leading to the meter. As the wheel is rotated the passage in trunnion 5 will register with port 8 connected to the pipe line and the pressure of gas will shift the diaphragm 3 thereby forcing gas from the wheel through port 9 to the meter, where it will be measured at a pressure proportional to the submergence of the outlet from the meter in the liquid in the tank 16.

I claim herein as my invention:

1. In an apparatus for measuring gas, the combination of means for withdrawing at successive intervals from a high pressure line, quantities of gas having in the aggregate a predetermined volumetric relation to the rate of flow through the pipe line, and means for measuring the gas so withdrawn at a uniform pressure lower than that in the pipe line.

2. In an apparatus for measuring gas, the combination of means controlled by the gas flowing through a pipe for withdrawing at successive intervals inversely proportional to the rate of flow a predetermined volume of gas from the pipe line, and means for measuring the gas so withdrawn at a uniform pressure lower than that in the pipe line.

3. In an apparatus for withdrawing gas from a pipe line, the combination of a hollow wheel, means for rotating the wheel, a diaphragm dividing the chamber in said wheel into two compartments, an inlet and an outlet for each compartment, and means for alternately opening and closing the inlet and outlet of one compartment and the outlet and inlet of the other compartment.

4. In an apparatus for measuring gas, the combination of means for withdrawing a predetermined volume of gas from a pipe line, a meter connected to such pipe line for operating the gas withdrawing means, a meter connected to the withdrawing means, and means for maintaining a uniform pressure of gas at the outlet from said last named meter.

In testimony whereof, I have hereunto set my hand.

JAS. P. FISHER.

Witnesses:
C. W. HILL,
R. K. TALLANT.